Figure 1:
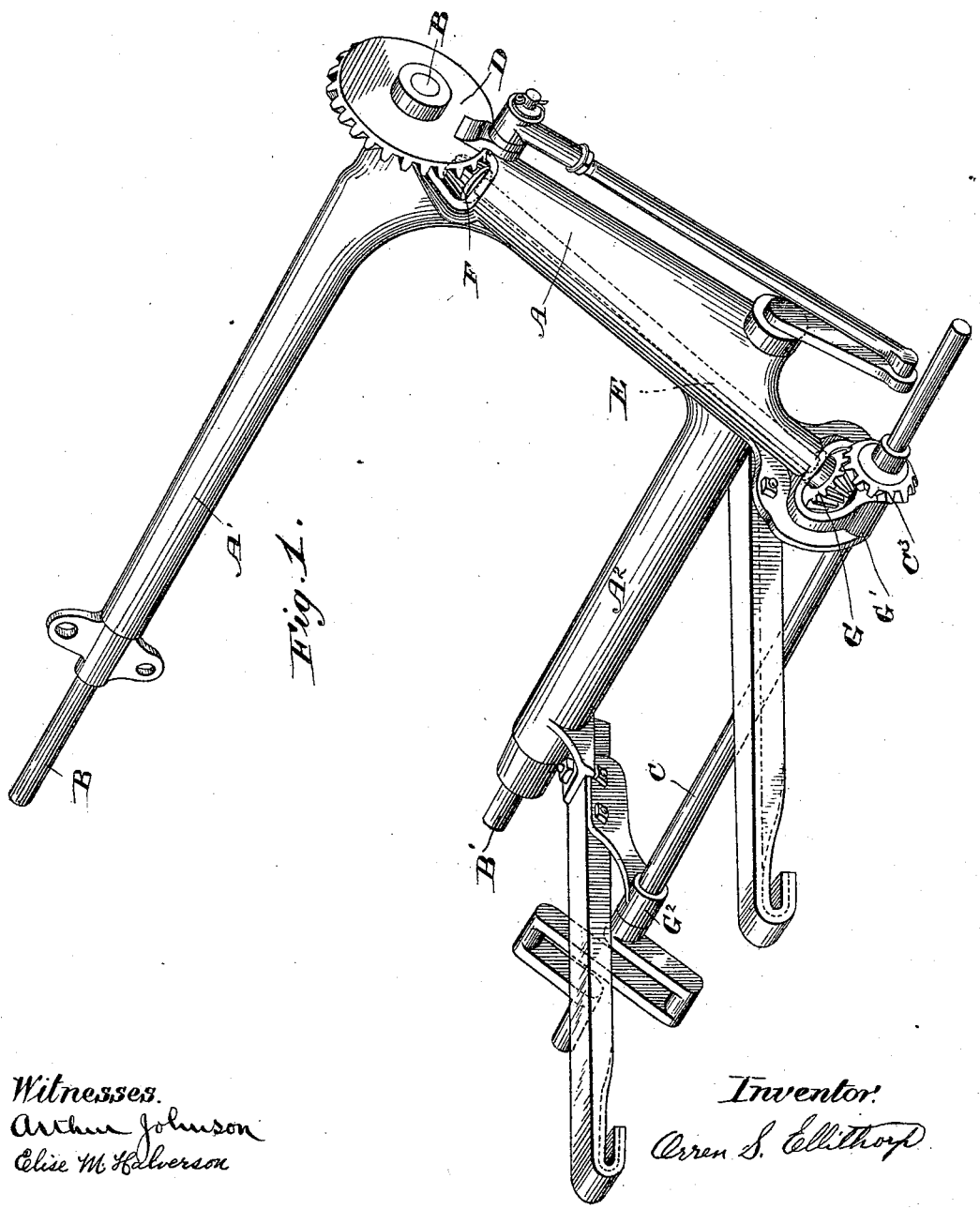

(No Model.) 2 Sheets—Sheet 1.

O. S. ELLITHORP.
GRAIN BINDER.

No. 470,236. Patented Mar. 8, 1892.

Witnesses.
Arthur Johnson
Elise M. Halverson

Inventor:
Orren S. Ellithorp

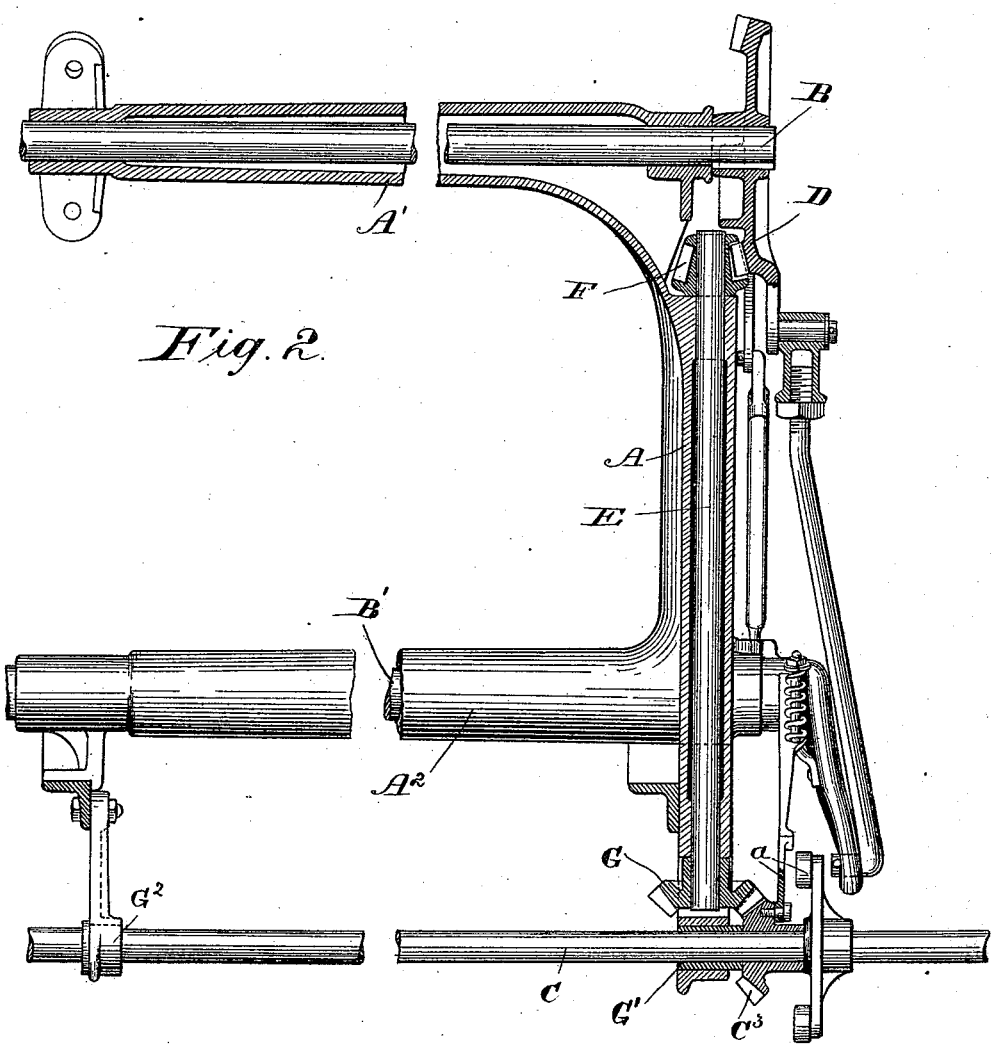

UNITED STATES PATENT OFFICE.

ORREN S. ELLITHORP, OF CHICAGO, ILLINOIS.

GRAIN-BINDER.

SPECIFICATION forming part of Letters Patent No. 470,236, dated March 8, 1892.

Application filed September 28, 1891. Serial No. 407,006. (No model.)

*To all whom it may concern:*

Be it known that I, ORREN S. ELLITHORP, of Chicago, in the county of Cook and State of Illinois, have invented certain new and useful Improvements in Grain-Binders, of which the following is a full description, reference being had to the accompanying drawings, in which—

Figure 1 is a perspective view; Fig. 2, a side view partly in section; Fig. 3, a section of a portion of the frame.

The binder which I have sought to improve is of what is known as the "Appleby type;" and my improvement consists in the adaptation of the frame to receive bevel-gearing for conveying motion from the packer-shaft to the main shaft of the binder. Heretofore it has been customary to secure the packer-shafts in journal-bearings supported upon various parts bolted to the frame; but as I wish the packer-shaft, the needle-shaft, and diagonal driving-shaft all to be journaled in a frame that can be jigged and bored, I extend the said binder-frame downward at the end having the diagonal shaft and form the packer-shaft bearing therein.

A is the end portion of the binder-frame, containing the upper horizontal part A' and the lower horizontal part A². Said parts are made tubular, the part A' being adapted to form internal journal-bearings for the main shaft B, and the lower horizontal portion adapted to form journal-bearings for the needle-shaft B'.

C is the packer-shaft, having clutching device *a* of a well-known form, and hence one that needs no description, as it forms no part of my invention. This shaft is supported in suitable bearings G' G². Upon the packer-shaft C, I place a bevel-pinion C³, securely keyed thereto.

G is a bevel-pinion secured to the lower end of the shaft E, which has at its upper end the pinion F, adapted to mesh with the bevel-gear D on the shaft B. This shaft E is incased within the main end portion of the binder-frame and hidden. Connecting the crank-wrist on the gear D with the crank of the needle-shaft is the usual pitman. The other operative parts of the ordinary binder may be assumed to be present. The lower portion of the end part of the frame is extended downward and adapted to receive the bearing G', thus making the supports for the bearings for the three connected shafts wholly as a single piece, thereby holding the gears in perfect mesh.

For lightness the frame parts are hollowed out by coring, as shown in Figs. 2 and 3, and I prefer to make the core which hollows out the main end portion of the frame also hollow out the wing of the main frame thrown upward to surround the shaft. The tubular space for the shaft E may, however, be produced by a special core. I also adapt the frame to form a housing for the pinion F, so that straws may not become entangled therewith, and, preferably, permit it to extend around the pinion G and form the support for the shaft C.

What I claim as my invention, and desire to secure by Letters Patent, is—

A binder-frame having the two horizontal tubular portions, the tubular portion of the main end part of the frame, the tubular bearing for the shaft E, and having also housings for the pinion, the lower end of the tubular portion of the main end part of the frame extended to the packer-shaft and adapted to receive the said packer-shaft journal-bearing, substantially as described.

ORREN S. ELLITHORP.

Witnesses:
ELISE M. HALVERSON,
ARTHUR JOHNSON.